United States Patent
Nichols et al.

(10) Patent No.: US 8,571,948 B1
(45) Date of Patent: Oct. 29, 2013

(54) EXTENSION OF CREDIT FOR MONETARY ITEMS STILL IN TRANSPORT

(75) Inventors: Michelle Nichols, Rock Hill, SC (US);
Todd Atwood, Charlotte, NC (US);
James Heddleson, Charlotte, NC (US);
Mark Waggoner, Keller, TX (US)

(73) Assignee: Bank of America Corporation, Charlotte, NC (US)

( * ) Notice: Subject to any disclaimer, the term of this patent is extended or adjusted under 35 U.S.C. 154(b) by 108 days.

(21) Appl. No.: 12/262,523

(22) Filed: Oct. 31, 2008

Related U.S. Application Data (60) Provisional application No. 61/061,987, filed on Jun. 16, 2008.

(51) Int. Cl.
G06Q 10/00 (2012.01)
G06Q 40/00 (2012.01)

(52) U.S. Cl.
USPC .............................................. 705/28; 705/38

(58) Field of Classification Search
USPC ......................................................... 705/28
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 4,443,692 A | 4/1984 | Nishimura | |
| 5,453,601 A | 9/1995 | Rosen | |
| 5,689,240 A | 11/1997 | Traxler | |
| 5,748,906 A | 5/1998 | Sandig | |
| 5,748,908 A | 5/1998 | Yu | |
| 5,936,220 A | 8/1999 | Hoshino et al. | |
| 5,952,639 A | 9/1999 | Ohki et al. | |
| 5,952,920 A | 9/1999 | Braddick | |
| 5,953,423 A | 9/1999 | Rosen | |
| 5,963,131 A | 10/1999 | D'Angelo et al. | |
| 6,028,517 A | 2/2000 | Sansone et al. | |
| 6,047,807 A | 4/2000 | Molbak | |
| 6,055,438 A | 4/2000 | Winner, Jr. | |
| 6,122,625 A | 9/2000 | Rosen | |
| 6,167,378 A | 12/2000 | Webber, Jr. | |
| 6,260,024 B1 | 7/2001 | Shkedy | |
| 6,483,433 B2 | 11/2002 | Moskowitz et al. | |

(Continued)

FOREIGN PATENT DOCUMENTS

| | | |
|---|---|---|
| DE | 4019265 | 11/1991 |
| DE | 4429815 | 2/1996 |

(Continued)

OTHER PUBLICATIONS

Oracle Database, Dec. 2003.*

(Continued)

*Primary Examiner* — Garcia Ade
(74) *Attorney, Agent, or Firm* — Banner & Witcoff, Ltd.; Michael A. Springs (57) ABSTRACT

Providing earlier funds availability or a line of credit for a deposit or other monetary package reported to be in a cash supply chain. Later, when the deposit physically arrives at a bank vault, then the actual amount of the deposit is reconciled against the accelerated funds or line of credit previously made available. The amount of accelerated funds or line of credit made available may be based upon the amount scheduled to be deposited, as well as a risk score for the customer making the deposit and/or for the transaction being made.

20 Claims, 5 Drawing Sheets

(56) References Cited

U.S. PATENT DOCUMENTS

| | | | |
|---|---|---|---|
| 6,487,542 B2 | 11/2002 | Ebata et al. | |
| 6,491,216 B1 | 12/2002 | May | |
| 6,498,603 B1 | 12/2002 | Wallace | |
| 6,526,273 B1 | 2/2003 | Link, II et al. | |
| 6,633,881 B2 | 10/2003 | Drobish et al. | |
| 6,736,314 B2 | 5/2004 | Cooper et al. | |
| 6,788,203 B1 | 9/2004 | Roxbury et al. | |
| 6,845,905 B2 | 1/2005 | Blad et al. | |
| 7,004,385 B1 | 2/2006 | Douglass | |
| 7,042,360 B2 | 5/2006 | Light et al. | |
| 7,076,458 B2 | 7/2006 | Lawlor et al. | |
| 7,149,336 B2 | 12/2006 | Jones et al. | |
| 7,201,313 B1 | 4/2007 | Ramachandran | |
| 7,212,992 B1 | 5/2007 | Kanevsky et al. | |
| 7,216,800 B1 | 5/2007 | Ramachandran | |
| 7,243,080 B2 | 7/2007 | Bhadra | |
| 7,248,160 B2 | 7/2007 | Mangan et al. | |
| 7,284,692 B1 | 10/2007 | Douglass | |
| 7,348,886 B2 | 3/2008 | Himberger et al. | |
| 7,350,230 B2 | 3/2008 | Forrest | |
| 7,375,638 B2 | 5/2008 | Light et al. | |
| 7,461,780 B2 | 12/2008 | Potts et al. | |
| 7,474,217 B2 | 1/2009 | Himberger et al. | |
| 7,537,153 B2 | 5/2009 | Hurwitz et al. | |
| 7,577,612 B2 | 8/2009 | Waller et al. | |
| 7,588,185 B2 | 9/2009 | Berquist et al. | |
| 7,623,033 B2 | 11/2009 | Ainsworth et al. | |
| 7,659,816 B2 | 2/2010 | Wandel | |
| 7,714,708 B2 | 5/2010 | Brackmann et al. | |
| 7,719,423 B2 | 5/2010 | Himberger et al. | |
| 7,748,610 B2 | 7/2010 | Bell et al. | |
| 7,778,456 B2 | 8/2010 | Jones et al. | |
| 7,908,188 B2 * | 3/2011 | Flynn et al. | 705/30 |
| 2001/0051922 A1 | 12/2001 | Waller et al. | |
| 2001/0054643 A1 | 12/2001 | Siemens | |
| 2002/0052193 A1 | 5/2002 | Chetty | |
| 2002/0052794 A1 | 5/2002 | Bhadra | |
| 2002/0091937 A1 | 7/2002 | Ortiz | |
| 2002/0095588 A1 | 7/2002 | Shigematsu et al. | |
| 2002/0111916 A1 | 8/2002 | Coronna et al. | |
| 2002/0138424 A1 | 9/2002 | Coyle | |
| 2002/0194122 A1 * | 12/2002 | Knox et al. | 705/39 |
| 2002/0195309 A1 | 12/2002 | Pope | |
| 2003/0011466 A1 | 1/2003 | Samuel et al. | |
| 2003/0050891 A1 | 3/2003 | Cohen | |
| 2003/0061153 A1 | 3/2003 | Birdsong et al. | |
| 2003/0083936 A1 | 5/2003 | Mueller et al. | |
| 2003/0122671 A1 | 7/2003 | Jespersen | |
| 2003/0163710 A1 | 8/2003 | Ortiz et al. | |
| 2003/0177102 A1 | 9/2003 | Robinson | |
| 2003/0208431 A1 | 11/2003 | Raynes et al. | |
| 2003/0213843 A1 | 11/2003 | Jackson | |
| 2003/0234719 A1 | 12/2003 | Denison et al. | |
| 2004/0016796 A1 | 1/2004 | Hanna et al. | |
| 2004/0056767 A1 | 3/2004 | Porter | |
| 2004/0083149 A1 | 4/2004 | Jones | |
| 2004/0100379 A1 | 5/2004 | Boman et al. | |
| 2004/0111346 A1 | 6/2004 | Macbeath et al. | |
| 2004/0124966 A1 | 7/2004 | Forrest | |
| 2004/0201454 A1 | 10/2004 | Waterhouse et al. | |
| 2005/0027594 A1 | 2/2005 | Yasnovsky et al. | |
| 2005/0091129 A1 | 4/2005 | Tien | |
| 2005/0108164 A1 | 5/2005 | Solafia, III et al. | |
| 2005/0183928 A1 | 8/2005 | Jones et al. | |
| 2005/0258234 A1 | 11/2005 | Silverbrook et al. | |
| 2005/0273347 A1 | 12/2005 | Dudley et al. | |
| 2006/0131395 A1 | 6/2006 | Potts et al. | |
| 2006/0247973 A1 | 11/2006 | Mueller et al. | |
| 2006/0271441 A1 | 11/2006 | Mueller et al. | |
| 2006/0282277 A1 | 12/2006 | Ng | |
| 2006/0288233 A1 | 12/2006 | Kozlay | |
| 2007/0005452 A1 | 1/2007 | Klingenberg et al. | |
| 2007/0008118 A1 | 1/2007 | Kassiedass | |
| 2007/0012602 A1 | 1/2007 | Baldassari et al. | |
| 2007/0034693 A1 | 2/2007 | Jouvin et al. | |
| 2007/0063016 A1 | 3/2007 | Myatt et al. | |
| 2007/0174156 A1 | 7/2007 | Emde et al. | |
| 2007/0198341 A1 | 8/2007 | Park | |
| 2007/0226142 A1 | 9/2007 | Hanna et al. | |
| 2007/0282724 A1 | 12/2007 | Barnes et al. | |
| 2008/0005019 A1 | 1/2008 | Hansen | |
| 2008/0005578 A1 | 1/2008 | Shafir | |
| 2008/0103959 A1 * | 5/2008 | Carroll et al. | 705/38 |
| 2008/0120237 A1 | 5/2008 | Lin | |
| 2008/0126515 A1 | 5/2008 | Chambers et al. | |
| 2008/0149706 A1 | 6/2008 | Brown et al. | |
| 2008/0155269 A1 | 6/2008 | Yoshikawa | |
| 2008/0199155 A1 | 8/2008 | Hagens et al. | |
| 2008/0223930 A1 | 9/2008 | Rolland et al. | |
| 2008/0249934 A1 | 10/2008 | Purchase et al. | |
| 2008/0262949 A1 | 10/2008 | Bond et al. | |
| 2008/0265019 A1 * | 10/2008 | Artino et al. | 235/379 |
| 2008/0303903 A1 | 12/2008 | Bentley et al. | |
| 2009/0006249 A1 | 1/2009 | Morgan et al. | |
| 2009/0006250 A1 | 1/2009 | Bixler et al. | |
| 2009/0032580 A1 | 2/2009 | Blachowicz et al. | |
| 2009/0051566 A1 | 2/2009 | Olsen et al. | |
| 2009/0051769 A1 | 2/2009 | Kuo et al. | |
| 2009/0065573 A1 | 3/2009 | Potts et al. | |
| 2009/0107800 A1 | 4/2009 | Nishida et al. | |
| 2009/0114716 A1 | 5/2009 | Ramachandran | |
| 2009/0164364 A1 * | 6/2009 | Galit et al. | 705/38 |
| 2009/0187482 A1 | 7/2009 | Blount et al. | |
| 2009/0216662 A1 * | 8/2009 | Crist et al. | 705/28 |
| 2010/0052844 A1 | 3/2010 | Wesby | |
| 2010/0076853 A1 | 3/2010 | Schwarz | |
| 2010/0274723 A1 | 10/2010 | Joab | |

FOREIGN PATENT DOCUMENTS

| | | |
|---|---|---|
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| GB | 2304953 | 3/1997 |
| WO | 9933040 | 7/1999 |
| WO | 03034359 | 4/2003 |
| WO | 2005041385 | 5/2005 |
| WO | 2005106722 | 11/2005 |

OTHER PUBLICATIONS

Powerpoint Presentation, DTS Product Overview, IFS, Apr. 2006, 17 pages.
Durbin, "Ford's F-150 goes high-tech", retrieved from <http://www.wheels.ca/article/173134>, Feb. 6, 2008, 4 pages.
Monthly Minutes from Banking Technology Operations Standing Committee (BTO), dated Mar. 20, 2007, 2 pages.
Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
Monthly Minutes for RFID SIG dated Mar. 19, 2008, 2 pages.
Office Action from related U.S. Appl. No. 12/262,534 dated Jun. 24, 2010.
Office Action from related U.S. Appl. No. 12/263,041 dated Mar. 12, 2010.
Office Action from related U.S. Appl. No. 12/262,908 dated Mar. 8, 2010.
Final Office Action for U.S. Appl. No. 12/262,908 dated Aug. 18, 2010.
Non-Final Office Action for U.S. Appl. No. 12/262,432 dated Aug. 18, 2010.
Non-Final Office Action for U.S. Appl. No. 12/263,041 dated Sep. 2, 2010.

(56) References Cited

OTHER PUBLICATIONS

European Search Report in EP09007879 dated Oct. 1, 2009.
European Search Report in EP09007878 dated Oct. 1, 2009.
International Search Report and Written Opinion for PCT/US2009/047452 dated Aug. 19, 2009.
Final Office in U.S. Appl. No. 12/263,041 dated Jan. 26, 2011.
Final Office in U.S. Appl. No. 12/262,448 dated Feb. 1, 2011.
Non-final Office in U.S. Appl. No. 12/262,522 dated Feb. 3, 2011.
Final Office in U.S. Appl. No. 12/262,432 dated Dec. 7, 2010.
Oracle Database SQL Reference, 10g Release 1 (10.1), Part No. B10759-01, Dec. 2003.
Non-Final Office Action for U.S. Appl. No. 12/262,448 dated Sep. 15, 2010.
Non-Final Office Action for U.S. Appl. No. 12/262,526 dated Sep. 16, 2010.
Non-Final Office Action for U.S. Appl. No. 12/262,472, dated Oct. 18, 2010.
Non-Final Office Action for U.S. Appl. No. 12/262,534, dated Oct. 14, 2010.
Notice of Allowance in U.S. Appl. No. 12/262,502 dated Oct. 19, 2010.
Final Office Action in U.S. Appl. No. 12/262,526 dated Nov. 23, 2010.
Non-Final Office Action in U.S. Appl. No. 12/262,928 dated Nov. 10, 2010.
Non-Final Office Action in U.S. Appl. No. 12/263,115 dated Nov. 16, 2010.
Non-Final Office Action in U.S. Appl. No. 12/262,532 dated Nov. 26, 2010.
PR Newswire: "Airborne Express Announces New Pricing": New York, Jan. 29, 2001.
Anonymous; "Parcel Pickup now a click away at Canada Post"; Canada Newswire, Aug. 31, 2011.

\* cited by examiner

EXTENSION OF CREDIT FOR MONETARY ITEMS STILL IN TRANSPORT

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), cash vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client's site where the deposit was prepared to the bank or bank's representative who will continue the processing of the deposit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients.

SUMMARY

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential theft, fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed monetary package) may be recognized much earlier, even prior to actual deposit or arrival of the package at the processing site.

Another potential benefit of centralized monetary package tracking may include providing access to funds backed by deposits that are still in the cash supply chain, even before reaching the vault.

Accordingly, further aspects are directed to providing a line of credit to a deposit customer, if the deposit has been reported to be in the cash supply chain. When the cash deposit physically arrives at the bank vault, then the actual amount of the deposit is reconciled against any amount of the line of credit that has been used, as well as against the account to which the deposit was targeted. The amount of the line credit may be based upon the amount scheduled to be deposited, as well as a risk score for the customer making the deposit and/or for the transaction being made.

Still further aspects are directed to providing earlier funds availability for a deposit reported to be in the cash supply chain. For example, when the cash deposit physically arrives at the bank vault, then the actual amount of the deposit is reconciled against the accelerated funds previously made available. The amount of accelerated funds made available may be based upon the amount scheduled to be deposited, as well as a risk score for the customer making the deposit and/or for the transaction being made. In other examples, the funds may be made available at any point in the supply chain, such as upon creation of the deposit, upon carrier pickup, or upon delivery to the vault. Furthermore, the funds may be made available immediately upon the deposit being at a particular point in the cash supply chain, or after a predetermined delay. The delay may be customizable on an individual customer basis and or by customer type/segment.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
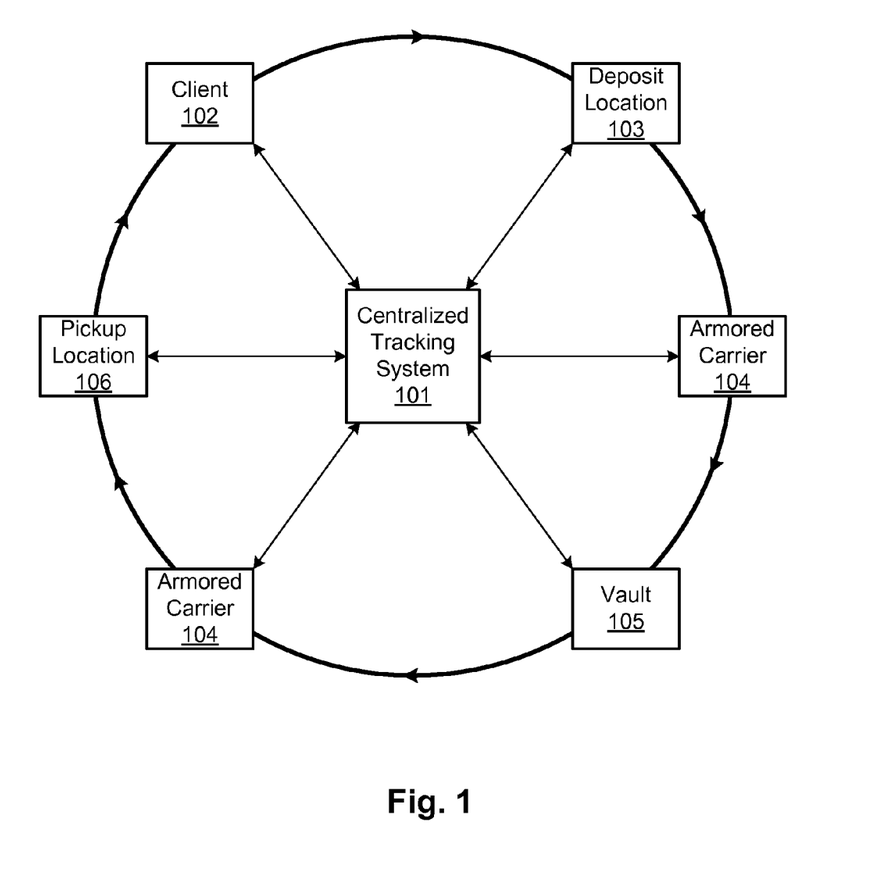
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to perform all functions attributed to it, such as receiving monetary package status reports from parties such as parties 102-106, maintaining data representing the monetary package status, and generating reports and alert messages from that monetary package status data. Bank account management system 310 may likewise include at least one computing device and at least one computer-readable medium that, together, are configured to perform all functions attributed to it.

A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at a phone or terminal through a wireless network or the Internet.

Deposit location 103 is the location at which client 102 releases custody of the deposit (such as in the form of a monetary package). This custody may be released by, for instance, depositing the cash into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104 (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
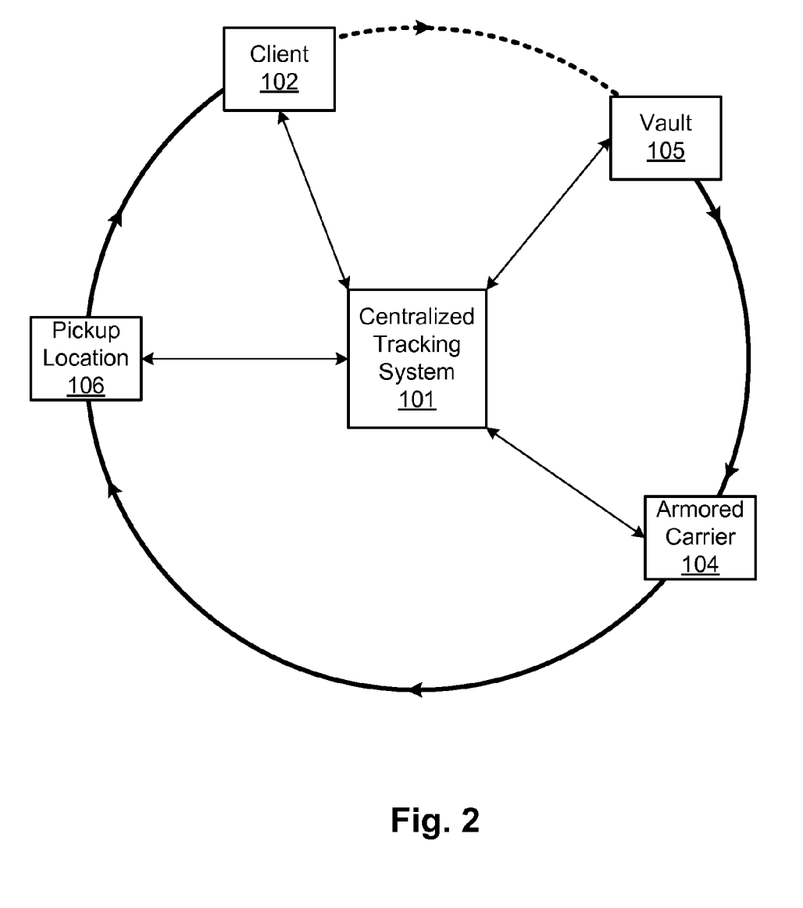
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
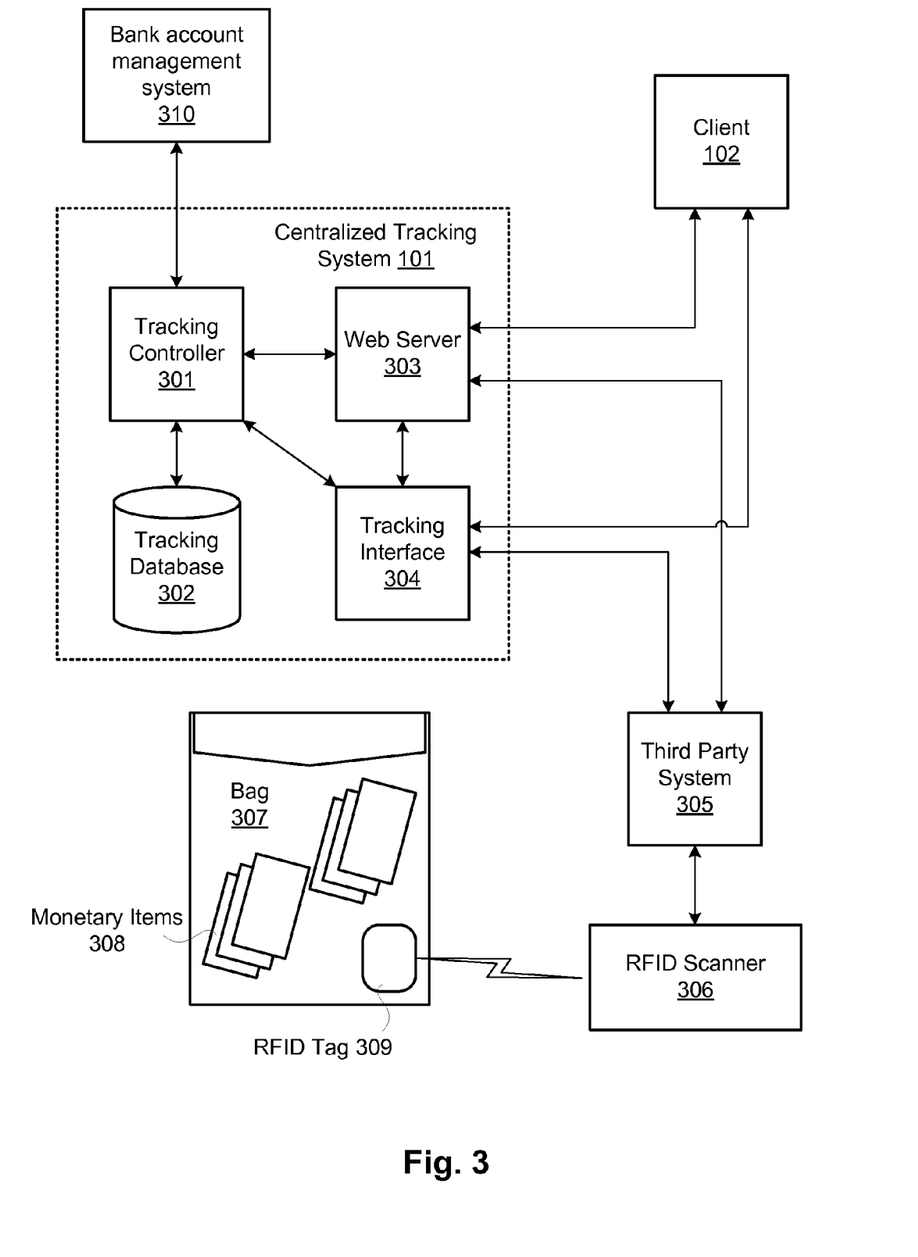
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Also, centralized tracking system 101 may be coupled to a remainder of the bank's account management system 310, which may handle account balance tracking, deposit and withdrawal reconcilement, funds availability determination, customer and transaction risk scoring, and other bank functions. Each of units 301, 303, 304, and 310 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is attached to or contained inside a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

The above discussion in connection with FIGS. 1-3 describes but a few examples of how monetary package tracking might be implemented. These and other implementations, as well as various features that may be provided in connection with monetary package tracking, will be discussed in further detail below.

As previously mentioned, the ability to track monetary packages throughout the cash supply chain may provide certain advantages. For example, such tracking may allow the bank to provide access to funds backed by a cash deposit that is still in the cash supply chain en route to the bank vault or to a third party transportation facility such as an armored carrier barn. These funds may be provided, for example, in two ways. In one embodiment, these funds may be provided in the form of a line of credit. In another embodiment, these funds may be provided in the form of accelerated funds availability. Both examples will be described in connection with FIGS. 4 and 5.

Figure 4:
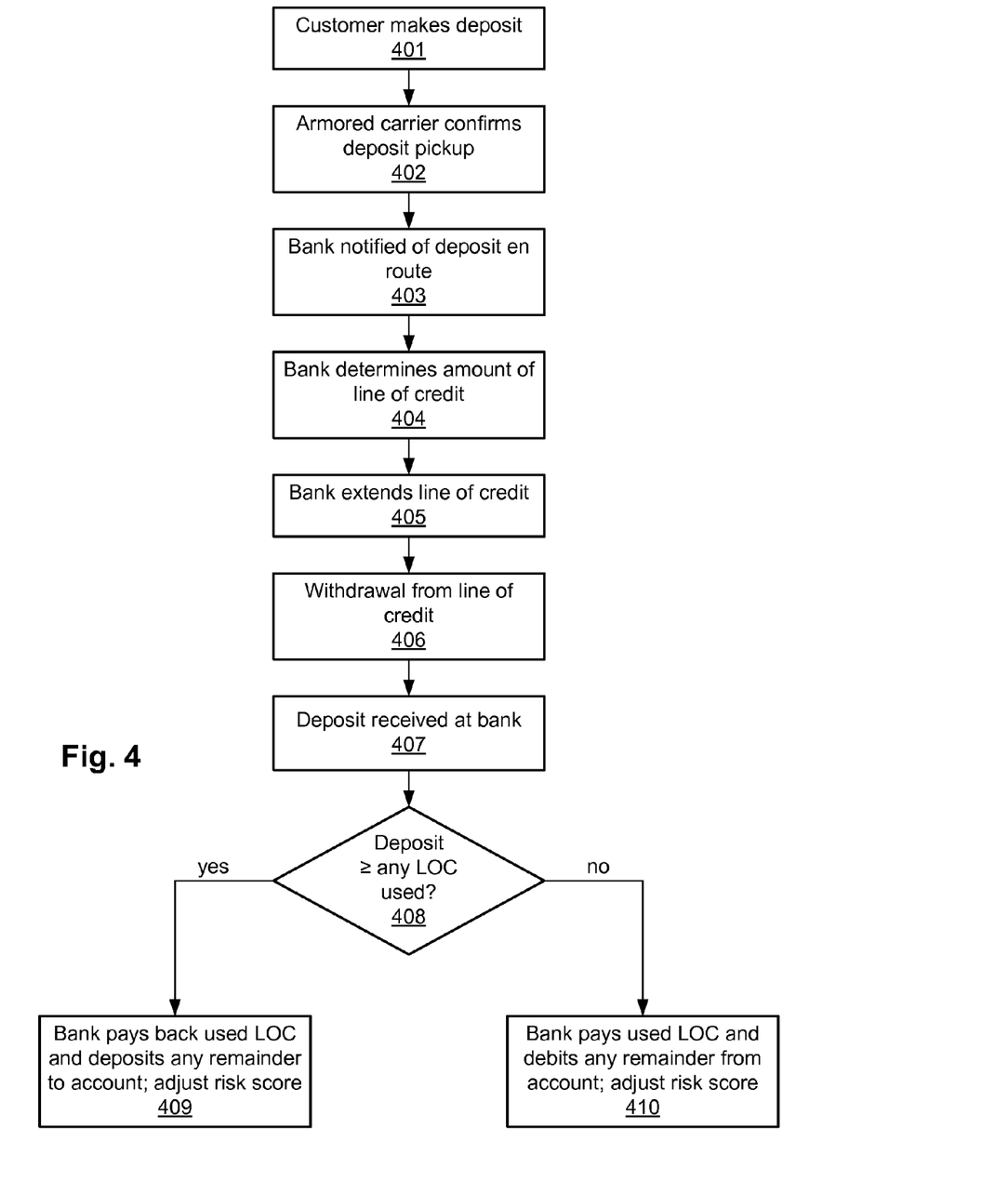
FIG. 4 is a flow chart showing illustrative steps that may be performed in providing a line of credit for deposits that are still in the cash supply chain prior to the bank vault.

FIG. 4 is a flow chart showing illustrative steps that may be performed in providing a line of credit for deposits that are still in the cash supply chain prior to the final receipt and processing at a bank vault, or prior to deposit posting. In step 401, the customer makes a cash deposit, such as at deposit location 103. The cash deposit may or may not have been pre-scheduled. Either way, at step 402, an armored carrier or other transport service picks up the cash deposit as a monetary package. Thus, the cash deposit may now be at point 104 of the cash supply chain. At some point prior to or during steps 401 or 402, RFID tag 309 or another type of identifier may be attached to the monetary package that uniquely identifies that monetary package from other monetary packages in the cash supply chain. Upon the monetary package being picked up from deposit location 103, at step 403 armored carrier 104 may notify centralized tracking system 101 that the monetary package identified by RFID tag 309 has been picked up, and what the current status of the monetary package is (e.g., whether the deposit is in the possession of a particular party to the cash supply chain, such as the armored carrier or another party). In addition, at any of steps 401-403, centralized tracking system 101 may be notified of the claimed cash content of the monetary package. The status information and claimed cash content information may be associated with the identifier of RFID tag 309 by tracking controller 301 in tracking database 302.

Bank account management system 310 may also be kept apprised of the status of the deposit through the cash supply chain. At some predetermined point in the cash supply chain, bank account management system 310 may decide to provide a line of credit to the depositor's account with the bank, based on the asserted cash amount of the deposit that is presently en route to the bank vault in the cash supply chain. The line of credit may be a provisional line of credit, since the line of credit is based on non-verified funds, and may be continue to be a provisional line of credit until the time that the deposit can be verified. This predetermined point many be anywhere as desired, such as armored carrier 104 or even deposit location 103 (e.g., where an automated machine or a third party receives the deposit from the depositing party). Other such predetermined points may be a particular location of armored carrier 104 and/or a combination of location and time status. For example, such as "point" in the cash supply chain sufficient for providing a line of credit may be where armored carrier 104 has had custody of the deposit for a predetermined amount of time, such as 12 hours, or has reached a predetermined point in the cash supply chain, such as being returned to the carrier's processing center.

The decision whether or not to extend a line of credit thus may be made by bank account management system 310 based on the status of the monetary package in the cash supply chain, a risk model, a credit score, and/or any other relevant information relating to the specific client location making the deposit. Other factors into that decision may include, for instance, a risk score of the party making the deposit and/or of the transaction itself. Using any one or more of these factors, bank account management system 310 may decide in step 404 how much, and for how long, to extend a line of credit for to the depositing party. This decision may be made prior to deposit pickup (e.g., the decision may be based on a standing arrangement with the client).

The risk scoring may be on any scale and in any units. As an example, the customer and/or the deposit transaction may be scored on a scale of 0 to 100, with zero being the highest risk (lowest score) and 100 being a perfect score with minimal risk. As another example, the risk score may be aligned with a FICA score. The risk score may be made on any basis, such as whether any problems have occurred in past transactions by that customer, the type of customer, the assets of the customer, etc. The risk score may further depend upon the amount claimed to be deposited in the present transaction and/or the point in the cash supply chain at which the credit is requested and/or used.

The amount of the line of credit to provide may be adjusted by the risk score and/or base on the point in the cash supply chain at which the credit is requested and/or used, and may further depend upon the amount claimed to be deposited. There may further be a maximum amount of line of credit allowed to be provided for a given transaction and/or cumulative for a given customer. As an example, the customer may claim to be depositing a certain amount of money into the cash supply chain en route to bank vault 105. If that customer's risk score is 100 (using the above illustrative scale), then the customer may qualify for a line of credit equal to the amount deposited, up to a certain maximum amount. But if that customer's risk score is only 50, then the customer may qualify, for instance, for only half the claimed deposit amount, up to the certain maximum amount. Also, if the customer has already made another deposit that is still in the cash supply chain but has not yet reach bank vault 105 or otherwise been reconciled, then the certain maximum amount may be compared not with the present claimed deposit amount, but rather with the total claimed deposit amount of both pending deposits.

After the amount has been determined (or simultaneously therewith), the bank may extend the line of credit in step 405. This may involve opening a new line of credit and/or expanding the total borrowable amount to an existing line of credit.

Next, it will be assumed for this example that the customer who was extended the line of credit in step 406, now uses at least a portion of the line of credit in step 406 to pay a third party. Such payment may include payment for goods and/or services, as well as payment into (investment) in an investment vehicle such as mutual funds, bonds, stocks, etc. The payment may be made using any type of cash, such as paper government-issued currency, or via a check, etc. This is able to occur even though the deposit is still pending and has not physically made its way to bank vault 105.

Finally, at some point in the future, the deposit is physically received at the bank vault 105 in step 407. After opening the monetary package containing the deposit and counting the actual amount of cash contained therein, in step 408 the bank may determine whether the actual amount contained in the deposit is at least equal to any used portion of the line of credit (that is, any amount of the line of credit withdrawn in step 406). If so, then the bank pays back the amount used for the line of credit and deposit any remaining amount in the deposit to the account to which the deposit was originally directed. The bank may further close the line of credit, charge fees for remaining balances/neglected terms, and/or reduce the borrowable amount, as appropriate.

However, the actual amount of cash in the deposit may not cover the amount of the line of credit withdrawn in step 406. This may occur where the actual amount deposited is less than the amount claimed to be deposited. This is one reason why the risk scoring may be helpful; if a customer is suspected of being a higher risk, then the bank may decide not to extend a line of credit for the full claimed deposit amount, duration, and/or other terms of an agreement between the bank and its client, in view of the greater likelihood that the actual deposit amount will be lower than the claimed deposit amount. This may therefore reduce the impact of honest mistakes by the customer or even of dishonest transactions by the customer intended to take advantage of an unsecured line of credit.

Thus, if the outcome of the determination in step 408 is "no," then in step 410 the bank may, among taking other actions, use the actual amount deposited to cover as much as possible of the used line of credit. If there is any remainder, then the remainder may be deposited into the target account. Again, the line of credit may be closed, fees may be imposed, and/or the borrowable amount against the line of credit may be reduced, after such reconciliation.

In both steps 409 and 410, the bank may further adjust that customer's risk score as appropriate. For instance, the bank may raise the customer's risk score in step 409 (perhaps indicating the good faith and accuracy of the customer) and lower the customer's risk score in step 410 (perhaps indicating the potential bad faith and/or errors on the part of the customer). Thus, the amount of the line of credit for future deposits may be affected by the performance of historical deposits.

Figure 5:
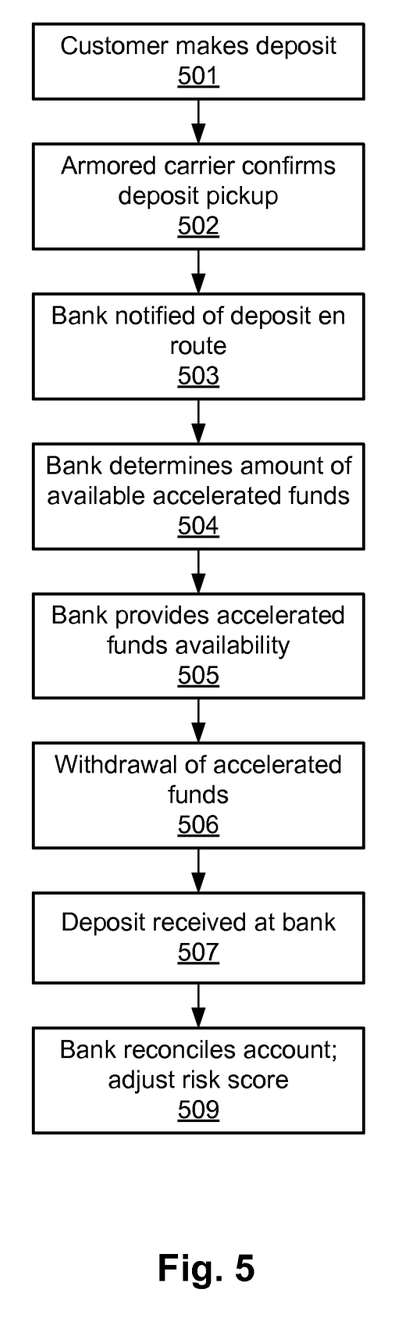
FIG. 5 is a flow chart showing illustrative steps that may be performed in providing accelerated funds availability for deposits that are still in the cash supply chain prior to the bank vault.

As previously mentioned, another way to provide benefits to deposit customers earlier in the process is to provide accelerated funds availability, rather than or in addition to providing a line of credit. FIG. 5 shows an example of this.

In FIG. 5, steps 501-503 may be identical to steps 401-403. Also, step 504 may be identical to step 404, except that the amount determined will be for funds availability rather than for a line of credit. In step 505, rather than providing a line of credit, the bank may provide availability to at least a portion of the claimed deposited amount, the amount made available having been determined in step 504.

As in step 406, it is assumed for this example that in step 506 the customer withdraws at least a portion of the funds made available from the pending deposit. The withdrawal may be in any type of cash, such as paper government-issued currency, or via a check, etc. Then, as in step 407, in step 507 the deposit is physically received by bank vault 105 or a third party deposit processing center, including but not limited to an armored carrier's facility.

In step 509, the bank counts the cash in the received deposit and reconciles the customer's account for which funds availability has been provided. If the amount claimed to be deposited is equal to or less than the amount actually deposited, then no problems exist and the account is reconciled accordingly. If the amount claimed to be deposited is greater than what is actually received, then a problem may exist if funds have been withdrawn exceeding the amount actually received.

After reconciliation and taking any other actions as appropriate, the bank may charge predetermined fees and/or adjust the risk score of the customer in the same manner as in FIG. 4. Here, for instance, the bank may adjust the risk score upward if there are no problems with the deposit transaction, and downward if there are.

The above-described steps may be performed by any of the computing devices of FIG. 3. In one example, steps 404-406, 408-410, 504-506, and 509 may be performed by bank account management system 310. Moreover, while the steps as shown in FIGS. 4 and 5 are illustrated as being sequential and in a particular order, the order may change and/or certain steps may be performed simultaneously with other steps. For example, ongoing or standing arrangements with clients may be verified in real time during any part of the process, which may affect the amount and/or timing of the line of credit and/or the funds availability. In addition, it is noted that the lines of credit and funds availability scenarios described herein may be applied as desired to any types of cash deposits, regardless of whether they are paper government-issued currency, coins, checks, or other negotiable instruments.

Thus, various systems, methods, and software have been described for tracking monetary packages through the cash supply chain, as well as for providing certain benefits to bank customers (or customers of other types of financial institutions) including advance lines of credit and/or funds availability for pending deposits.

The invention claimed is:

1. A method, comprising:
    determining, by a computing device, that a non-verified cash deposit bag is scheduled to be physically received by a bank and is in custody of an armored carrier;
    waiting at least a predetermined minimum amount of time after the non-verified cash deposit bag is in the custody of the armored carrier; and
    providing a line of credit responsive to the determining and responsive to expiration of the minimum amount of time, and prior to the non-verified cash deposit bag being physically received by the bank.

2. The method of claim 1, further comprising determining an amount of the line of credit based upon an amount scheduled to be deposited in the non-verified cash deposit bag.

3. The method of claim 2, wherein the determining the amount of the line of credit is further based upon a risk score associated with at least one of the customer and the amount.

4. The method of claim 1, further comprising determining an amount of the line of credit to be equal to an amount scheduled to be deposited in the non-verified cash deposit bag.

5. The method of claim 1, further comprising transferring monetary value from the line of credit to a third party.

6. The method of claim 1, further comprising physically receiving and verifying the non-verified cash deposit bag at the bank.

7. The method of claim 6, further comprising, after the physically receiving the cash deposit bag, applying at least a first portion of physically received cash within the cash deposit bag toward a loan balance of the line of credit.

8. The method of claim 6, further comprising, after the physically receiving the cash deposit bag, paying at least a first portion of physically received cash within the cash deposit bag to an account.

9. The method of claim 1, further comprising receiving an electronic message indicating a scheduled amount of the non-verified cash deposit bag.

10. A non-transitory computer-readable medium storing computer-executable instructions for performing a method, the method comprising:

determining that a non-verified cash deposit bag is scheduled to be physically received by a bank and is in custody of an armored carrier;

determining that a predetermined minimum amount of time has passed after the non-verified cash deposit bag is in the custody of the armored carrier; and     providing a line of credit responsive to the determining that the verified cash deposit bag is scheduled to be physically received and responsive to determining that the amount of time having passed, and prior to the non-verified cash deposit bag being physically received by the bank.

11. The non-transitory computer-readable medium of claim 10, wherein the method further comprises determining an amount of the line of credit based upon an amount scheduled to be deposited in the non-verified cash deposit bag.

12. The non-transitory computer-readable medium of claim 11, wherein the determining the amount of the line of credit is further based upon a risk score associated with at least one of the customer and the amount.

13. The non-transitory computer-readable medium of claim 10, wherein the method further comprises determining an amount of the line of credit to be equal to an amount scheduled to be deposited in the non-verified cash deposit bag.

14. The non-transitory computer-readable medium of claim 10, wherein the method further comprises transferring monetary value from the line of credit to a third party.

15. The non-transitory computer-readable medium of claim 10, wherein the method further comprises, after physically receiving the non-verified cash deposit bag, applying at least a first portion of physically received cash within the cash deposit bag toward a loan balance of the line of credit.

16. The non-transitory computer-readable medium of claim 10, wherein the method further comprises, after physically receiving the non-verified cash deposit bag, paying at least a first portion of physically received cash within the cash deposit bag to an account.

17. The non-transitory computer-readable medium of claim 10, wherein the method further comprises receiving an electronic message indicating a scheduled amount of the non-verified cash deposit bag.

18. The method of claim 1, wherein providing the line of credit comprises providing the line of credit after the non-verified cash deposit bag is physically picked up for transport from a deposit location.

19. The non-transitory computer-readable medium of claim 10, wherein providing the line of credit comprises providing the line of credit after the non-verified cash deposit bag is physically picked up for transport from a deposit location.

20. A method, comprising:

determining, by a computing device, that a non-verified cash deposit bag has been picked up for transport from a deposit location;

waiting at least a predetermined minimum amount of time after the non-verified cash deposit bag is in the custody of the armored carrier; and     upon expiration of the amount of time, providing a line of credit responsive to the determining, and prior to the non-verified cash deposit bag being physically received by the bank.

\* \* \* \* \*